(12) United States Patent
Forsyth

(10) Patent No.: US 9,680,660 B2
(45) Date of Patent: Jun. 13, 2017

(54) SELF-SERVICE TERMINAL

(75) Inventor: Gordon A. Forsyth, Perth and Kinross (GB)

(73) Assignee: NCR Corporation, Duluth, GA (US)

( * ) Notice: Subject to any disclaimer, the term of this patent is extended or adjusted under 35 U.S.C. 154(b) by 1740 days.

(21) Appl. No.: 12/004,366

(22) Filed: Dec. 20, 2007

(65) Prior Publication Data

US 2009/0161580 A1   Jun. 25, 2009

(51) Int. Cl.
*G06F 15/16* (2006.01)
*H04L 12/24* (2006.01)

(52) U.S. Cl.
CPC .............. *H04L 12/24* (2013.01); *H04L 41/00* (2013.01); *H04L 41/0213* (2013.01); *H04L 41/046* (2013.01); *H04L 41/06* (2013.01)

(58) Field of Classification Search
CPC ..... H04L 12/24; H04L 41/00; H04L 41/0213; H04L 41/046; H04L 41/06
USPC .................. 709/230; 902/38–40; 235/379
See application file for complete search history.

(56) References Cited

U.S. PATENT DOCUMENTS

| 5,984,178 | A * | 11/1999 | Gill et al. ........................ 235/379 |
| 6,766,371 | B1 * | 7/2004 | Hipp .................... G06F 9/4843 709/225 |
| 6,789,730 | B1 * | 9/2004 | Trelawney et al. ............ 235/376 |
| 6,826,603 | B1 * | 11/2004 | Giroir et al. .................... 709/220 |
| 8,893,260 | B2 * | 11/2014 | Sadasivan ........................ 726/15 |
| 2005/0263583 | A1 * | 12/2005 | Schlabach et al. ............ 235/379 |
| 2006/0242284 | A1 * | 10/2006 | Savage ............................ 709/223 |
| 2008/0263640 | A1 * | 10/2008 | Brown .............................. 726/5 |
| 2008/0291273 | A1 * | 11/2008 | Cutsforth ............... H01R 39/58 348/143 |
| 2009/0079560 | A1 * | 3/2009 | Fries et al. ................. 340/539.22 |
| 2009/0273713 | A1 * | 11/2009 | Goldman et al. ............. 348/563 |
| 2015/0195231 | A1 * | 7/2015 | Mahajan ................. H04L 51/18 709/206 |

OTHER PUBLICATIONS

National Institute of Standards and Technology, "Data Encryption Standards", Dec. 30, 1993, pp. 1-21.*
Cooney, Michael, "IBM to marry SNA, LAN traffic", Jan. 23, 1995, Network World, vol. 12, No. 4, pp. 1, 91.*
J. Case et al, RFC 1098: A Simple Network Management Protocol (SNMP), Apr. 1989, p. 1-33.*
James Hoopes, Eye on SNA Gateways: eNetwork Communication server for Windows NT and SNA Server, Jan. 1, 1999, Systems iNEWS Magazine.*

* cited by examiner

*Primary Examiner* — Ryan Jakovac
(74) *Attorney, Agent, or Firm* — Schwegman, Lundberg & Woessner

(57) ABSTRACT

A self-service terminal comprises a plurality of devices, each device providing management information. A management agent is installed in the terminal and adapted to monitor the plurality of devices. In the event that management information from a device indicates that there is a fault, the management creates and transmits a notification. A communications stack is adapted to receive the transmitted notification from the management agent. A self-service terminal application is adapted to (i) monitor the communications stack to receive the transmitted notification, (ii) package the notification within a host message conforming to a host messaging format, and (iii) transmit the host message to a remote host via a legacy network.

5 Claims, 3 Drawing Sheets

SELF-SERVICE TERMINAL

BACKGROUND

The present invention relates to a self-service terminal (SST).

SSTs are public access devices that are suitable for allowing a user to conduct a transaction or to access information in an unassisted manner and/or in an unattended environment. An SST deployer may decide to provide human assistance and/or supervision for users of the SST; however, SSTs are typically designed so that such assistance and/or supervision is not essential. This means that SSTs generally need to be fault tolerant, and to have effective fault handling processes to retain the SST in service when a fault does occur.

Common examples of SSTs include automated teller machines (ATMs), information kiosks, financial services centers, bill payment kiosks, lottery kiosks, postal services machines, check-in and check-out terminals such as those used in the hotel, car rental, and airline industries, retail self-checkout terminals, vending machines, and the like.

A particularly important example of an SST is an ATM. ATMs typically include a plurality of devices that perform functions to enable transactions to be executed. To ensure that an ATM remains in service, it is important to be able to detect any faults in an ATM quickly. It is also important to be able to detect faults from a remote location because ATMs operate in an unassisted environment.

An ATM typically includes management software to monitor the state of health of devices within the ATM. State of the art management software for computing devices typically uses IP networks to provide automated notification of device status information; however, many ATM networks are based on legacy network technologies, such as SNA networks, which do not support this functionality. In addition, some ATM networks use host-driven software to control the operation of the ATMs, rather than peer-to-peer software.

SUMMARY

According to a first aspect of the present invention there is provided a method of operating a self-service terminal, the method comprising: receiving management information via a communications stack for use with a first network; preparing a message using a protocol for transmission across a second network, where the message includes the management information; and transmitting the prepared message to a host via the second network so that the host receives the management information from the self-service terminal without requiring the self-service terminal to be coupled to the first network.

The management information may relate to the status of a device, an operation performed by the device, a fault detected by the device, or the like. The management information may include a status code. The management information may be provided by an open management service, such as that provided by Windows Management Instrumentation (trade mark) as part of a Windows (trade mark) operating system, or by a proprietary management system.

The communications stack may be for use with a peer-to-peer network, such as an IP network.

The communications stack may receive messages from a management application.

The management application may be a simple network management protocol (SNMP) agent.

The step of receiving management information via the communications stack may include monitoring the communications stack for messages received at a predetermined port.

The second network may comprise a centralized, host-based network, such as an SNA network.

The step of preparing a message using a protocol for transmission across a second network may include encrypting the management information.

The step of transmitting the prepared message to a host via the second network may include transmitting the prepared message as a message type corresponding to an unsolicited message.

The method may comprise the further steps of the host receiving the prepared message; parsing the received message to ascertain if the message contains information relevant to the host (such as terminal information) or management information; and in the event that the message contains management information, forwarding the management information to a remote management centre responsible for maintaining the self-service terminal in normal operation. The remote management centre may perform centralized maintenance dispatch and management functions.

The step of parsing the received message may include ascertaining if a predetermined device identifier (a special identifier) is associated with that message. The special identifier may be used to indicate that the message contains management information that is to be forwarded from the host to the remote management centre. Such management information may contain information that is vendor-dependent and terminal-dependent so that the host may not be able to understand the significance of the management information.

The self-service terminal may be an automated teller machine (ATM).

By virtue of this aspect of the invention an SST is able to execute software requiring an IP network without the SST having to be connected to an IP network. This enables a host to receive standards-based management information from an SST on a legacy network without having to upgrade the legacy network to an IP network.

According to a second aspect of the present invention there is provided a self-service terminal comprising: a plurality of devices, each device providing management information; a management agent adapted to monitor the plurality of devices and to create and transmit a notification in the event that management information from a device indicates that there is a fault; a communications stack for receiving the transmitted notification from the management agent; a self-service terminal application adapted to (i) monitor the communications stack to receive the transmitted notification, (ii) package the notification within a host message conforming to a host messaging format, and (iii) transmit the host message to a remote host via a legacy network.

As used herein, the term "legacy network" refers to any network that is not an IP network.

The management agent may comprise an SNMP agent.

The communications stack may comprise a TCP/IP stack.

The self-service terminal application may be an ATM application including code for monitoring SNMP traps.

The self-service terminal may be an automated teller machine (ATM), information kiosk, financial services centre, bill payment kiosk, lottery kiosk, postal services machine, check-in and check-out terminal such as those used in the hotel, car rental, and airline industries, or a retail self-checkout terminal.

The devices may be selected from the group comprising: a card reader, a display, an encrypting keypad, a receipt printer, a statement printer, a dispenser, a cheque processing module, a cash recycler, a check depository, a currency depository, communication ports, and the like.

According to a third aspect of the present invention there is provided a self-service terminal system, the system comprising: a host coupled by a legacy network to a plurality of self-service terminals, each terminal including (i) a plurality of devices, each device providing management information, (ii) a management agent adapted to monitor the plurality of devices and to create and transmit a notification in the event that management information from a device indicates that there is a fault, (iii) a communications stack for receiving the transmitted notification from the management agent using internet protocol (IP), (iv) a self-service terminal application adapted to (a) monitor the communications stack to receive the transmitted notification, (b) package the notification within a host message conforming to a host messaging format, and (c) transmit the host message to the host via the legacy network.

The host messaging format may comprise NDC provided by NCR Corporation (trade mark) (assignee of this application), 91x (such as 911 or 912) provided by Diebold Corporation (trade mark) of Canton, Ohio, or the like.

The system may further comprise a management centre to which the host transmits the notification.

According to a fourth aspect of the present invention there is provided a management centre adapted to manage a network of self-service terminals, where the terminals are connected to a host by a legacy network, the management centre being adapted to receive a notification from a management agent within one of the self-service terminals via the host despite the management agent not being able to transmit information across the legacy network directly.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
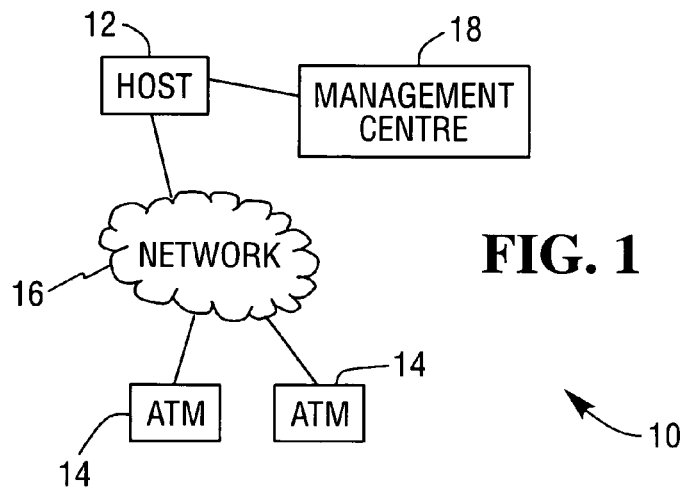
FIG. 1 is a block diagram illustrating a system including a host coupled to self-service terminals according to one embodiment of the present invention.

Reference is first made to FIG. 1, which is a block diagram illustrating a self-service terminal system 10, in the form of an ATM system, according to one embodiment of the present invention. The ATM system 10 comprises a host 12, coupled to a plurality of ATMs 14 (only two of which are illustrated in FIG. 1) via a network 16, and a management centre 18 coupled to the host 12.

In this system, the ATMs 14 are host-driven, which means that the host 12 sends commands to the ATMs 14 relating to actions that the ATM 14 must perform and screens that the ATM 14 must display. The host 12 receives communications from the ATMs 14. The communications typically include (i) requests, (ii) responses, and (iii) unsolicited messages. Requests typically include transaction requests to authorize transactions entered by customers at the ATMs 14, or to transfer funds between accounts held by a customer at one of the ATMs 14. The responses typically include terminal information (such as counters, supplies data, deposit note definitions, encryption key management information, or the like) or management information (such as status reports, logs of device usage, tallies of device usage, or the like) from devices in the ATMs 14. Unsolicited messages typically include management information to inform the host 12 of a fault, status, or other condition within the ATMs 14.

The network 16 may be an SNA network, or some other network that does not support the TCP/IP protocol (such a network is referred to herein as a "legacy network").

Figure 2:
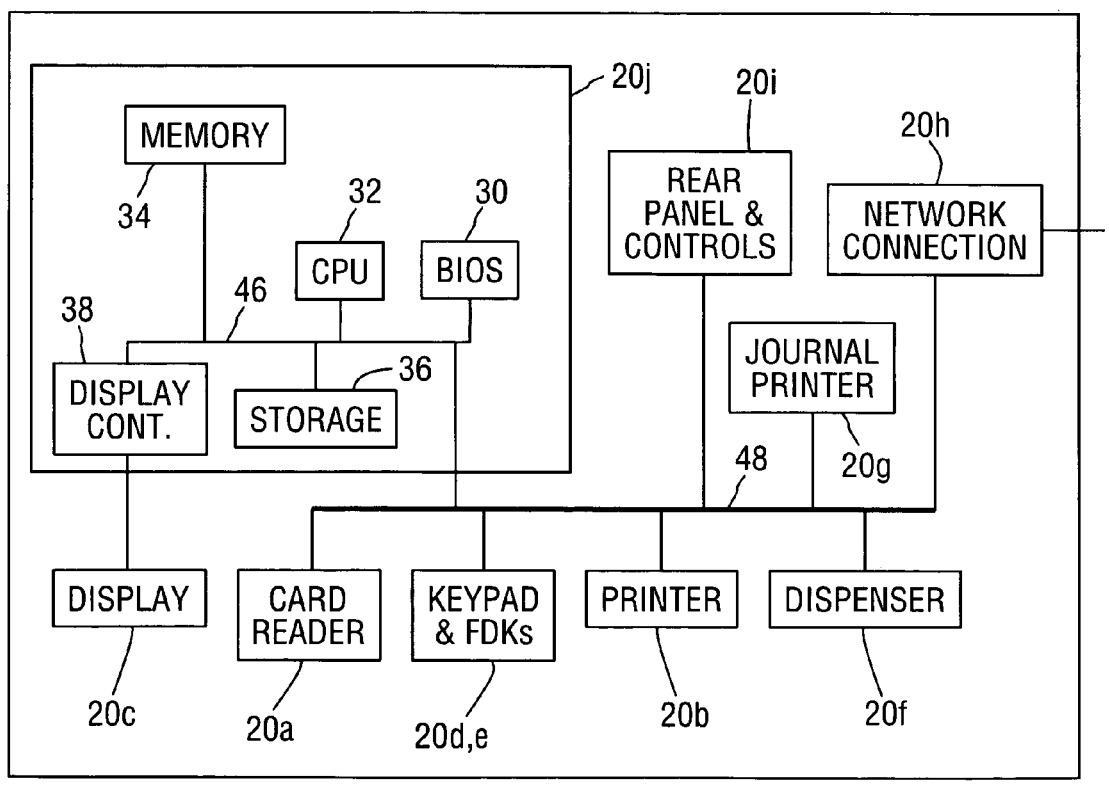
FIG. 2 is a block diagram showing one of the self-service terminals of FIG. 1 in more detail.

Reference will now also be made to FIG. 2, which illustrates one of the ATMs 14 of FIG. 1 in more detail.

The ATM 14 comprises a plurality of internal devices 20 mounted within the ATM 14, including: a card reader device 20a; a receipt printer device 20b; a display 20c and associated function display keys (FDKs) 20d disposed as two columns, each on opposing narrow sides of the display 20c; an encrypting keypad device 20e; a dispenser device 20f; a journal printer device 20g for creating a record of every transaction executed by the ATM 14, a network device 20h for accessing the host 12; a rear operator panel (including control switches in the form of small FDKs) 20i, and a controller device 20j (in the form of a PC core) for controlling the operation of the ATM 14, including the operation of the other devices 20.

The controller 20j comprises a non-volatile memory 30 storing a BIOS, a microprocessor 32, associated main memory 34, storage space 36 in the form of a disk drive, and a display controller 38 in the form of a graphics card.

The display 20c is connected to the microprocessor 32 via a graphics card 38 installed in the controller 20j and one or more internal controller buses 46. The other ATM devices (20a, b, and 20d to 20i) are connected to the ATM controller 20j via a device bus 48 (in the form of a Universal Serial Bus (USB)) and the one or more internal controller buses 46.

Initialization of the ATM

Figure 3:
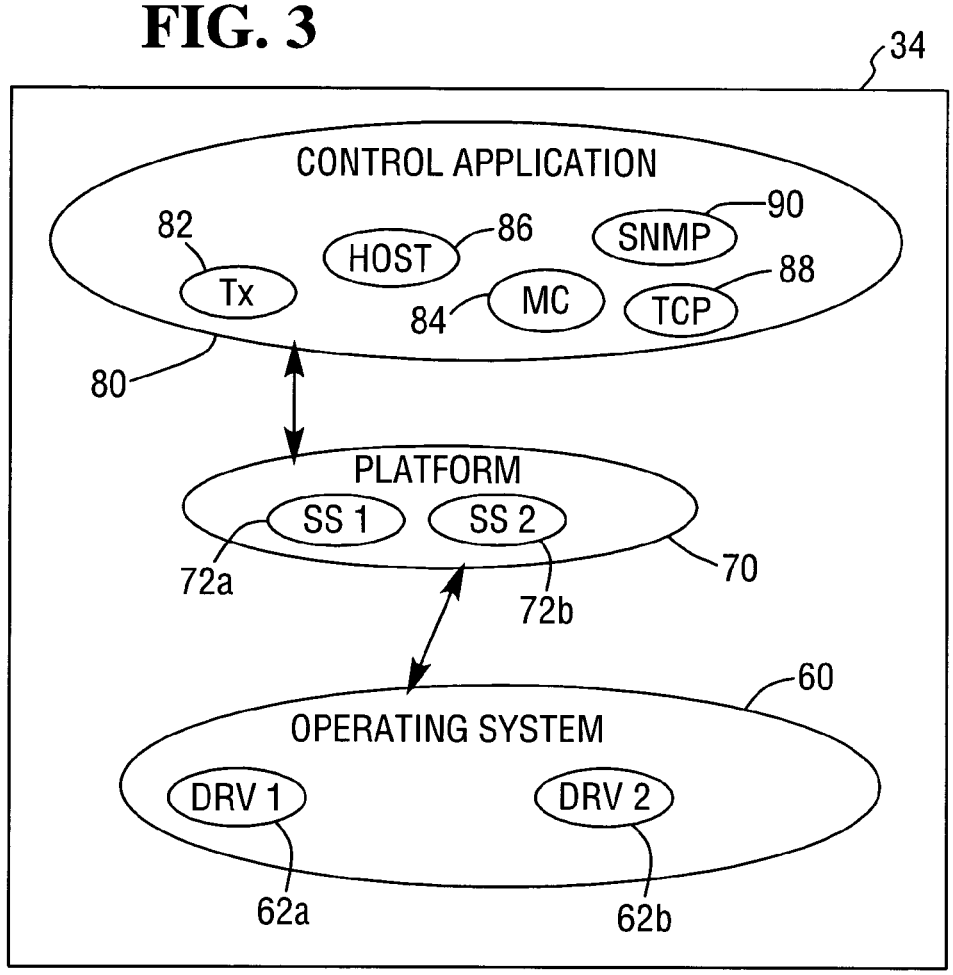
FIG. 3 is a schematic diagram illustrating software components executing in a part (the controller) of the SST of FIG. 2.

When the ATM 14 is booted up, the microprocessor 32 accesses the disk drive 36 and loads the main memory 34 with software components, as will be described with reference to FIG. 3, which is a schematic diagram illustrating how software components interact in main memory 34.

Operating System

The microprocessor 32 loads an operating system kernel 60 into the main memory 34. In this embodiment, the operating system is a Windows XP (trade mark) operating system, available from Microsoft Corporation (trade mark). The operating system includes a plurality of device drivers 62a,b, . . . for interfacing with standard computing devices such as the magnetic disk drive 36, the display 20c, a serial port, and the like.

Run-Time Platform

The microprocessor 32 also loads a run-time platform 70 into the main memory 34. In this embodiment, the runtime platform 70 is a set of APTRA (trade mark) XFS components, available from NCR Corporation, 1700 S. Patterson Blvd., Dayton, Ohio 45479, U.S.A. The run-time platform 70 provides a range of programming facilities specific to self-service terminal devices and services.

The run-time platform 70 includes a plurality of self-service device drivers 72a,b, . . . that interface with self-service specific devices (such as the card reader device 20a, the receipt printer device 20b, and the like).

One function of the run-time platform 70 is to enhance the operating system 60 so that the operating system and run-time platform 70 together provide high level access to all of the devices 20, including both standard computing devices (via the operating system 60), and non-standard computing devices (via the run-time platform 70). Thus, the combination of the run-time platform 70 and the operating system 60 can be viewed as providing a complete ATM operating system.

Control Application

The microprocessor 32 also loads a control application (CA) 80 into the main memory 34. For clarity, and to aid understanding, the CA 80 is represented in FIG. 3 as comprising a number of logical components: a transaction processing component 82; a management component 84; a host communication component 86 (a legacy network connection) for preparing messages for transmission across the SNA network 16 using a proprietary protocol; a TCP/IP software stack 88 (a communications stack), which is monitored by the host communication component 86; and an SNMP agent 90.

The transaction processing component 82 provides transaction processing functions for customers and for maintenance personnel. This allows customers to execute transactions at the ATM 14, and maintenance personnel to diagnose, maintain, and repair devices 20 in the ATM 14.

The management component 84 provides device management functions in response to requests received from the host 12, and/or from maintenance personnel at the ATM 14.

The SNMP agent 90 is registered with the management component 84 and receives status and fault information therefrom. This status and fault information is provided by the management component 84 in response to changes in the devices 20 or in response to a request from the SNMP agent 90.

The host communication component 86 is responsible for sending messages to and receiving messages from the host 12. As the ATM 14 is host-driven, it is important for the ATM 14 to be able to communicate with the host 12. The host communication component 86 sends communications according to a predefined format, in this embodiment, the NDC messaging format (as defined by NCR Corporation) (trade mark). In this format, messages may be solicited (such as a response to a request for terminal information from the host 12), or unsolicited (such as a transaction request or an event notification). An event notification is similar to an SNMP trap, but because the network 16 is not an IP network, an SNMP trap cannot be sent.

The TCP/IP software stack 88 has an IP address to which the SNMP agent 90 may send messages. The TCP/IP software stack 88 accesses a loopback adapter driver (provided by Microsoft Corporation (trade mark) for use with the Microsoft NT operating system). The loopback adapter allows the SNMP agent 90 to send messages to a virtual IP address; that is, an IP address that does not have any corresponding hardware. This IP address is configured to be the loopback adapter IP address (127.0.0.1). Any messages sent from the SNMP agent 90 to the loopback adapter IP address are received by the TCP/IP software stack 88. The TCP/IP software stack 88 receives these messages and provides them to the host communication component 86 for relaying to the host 12.

Operation of the ATM

Figure 4:
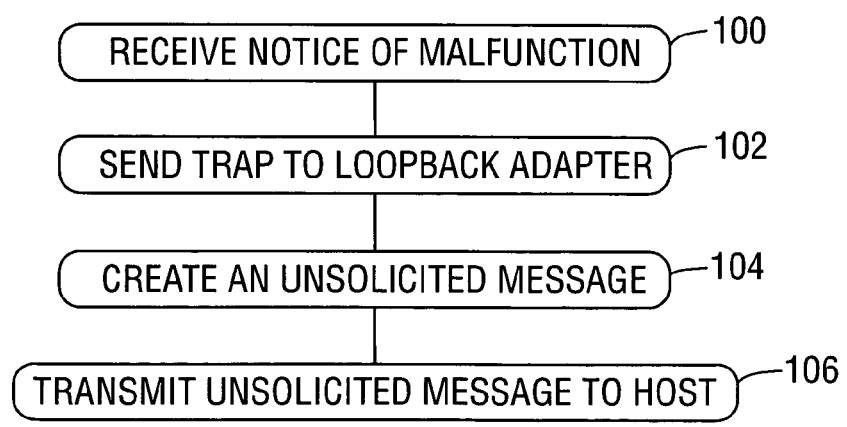
FIG. 4 is a flowchart illustrating the steps involved in forwarding management information received by one of the software components of FIG. 3 (an SNMP agent) to the host of FIG. 1.

The operation of the ATM 14 will now be described with reference to FIG. 4, which is a flowchart illustrating the steps involved in forwarding management information received by the SNMP agent 90 to the host 12. In this example, the management information is a fault with the dispenser device 20f.

Initially, the SNMP agent 90 is notified by the management component 84 that the dispenser device 20f has a malfunction (step 100), and includes details of a status code corresponding to the malfunction. In this example, the malfunction is a failure of a note thickness sensor in the dispenser device 20f.

The SNMP agent 90 then sends a new incident trap to the loopback adapter IP address (127.0.0.1) (step 102), which the TCP/IP software stack 88 receives. The new incident trap includes management information such as the type of device (the dispenser device 20f) that malfunctioned, the status code, the time at which the malfunction occurred, and the like.

The host communication component 86 constantly monitors the TCP/IP software stack 88 for received traps. When this new incident trap is received by the TCP/IP software stack 88, the host communication component 86 incorporates the new incident trap into an unsolicited message in the NDC message format (step 104). This unsolicited message includes a special identifier (a flag) to indicate that the unsolicited message includes SNMP management information. Other types of unsolicited messages are possible that do not have a special identifier set; such messages do not include SNMP management information.

Optionally, the host communication component 86 may also encrypt the management information.

The host communication component 86 then transmits the unsolicited message across the SNA network 16 to the host 12 (step 106).

Operation of the Back-Office

Figure 5:
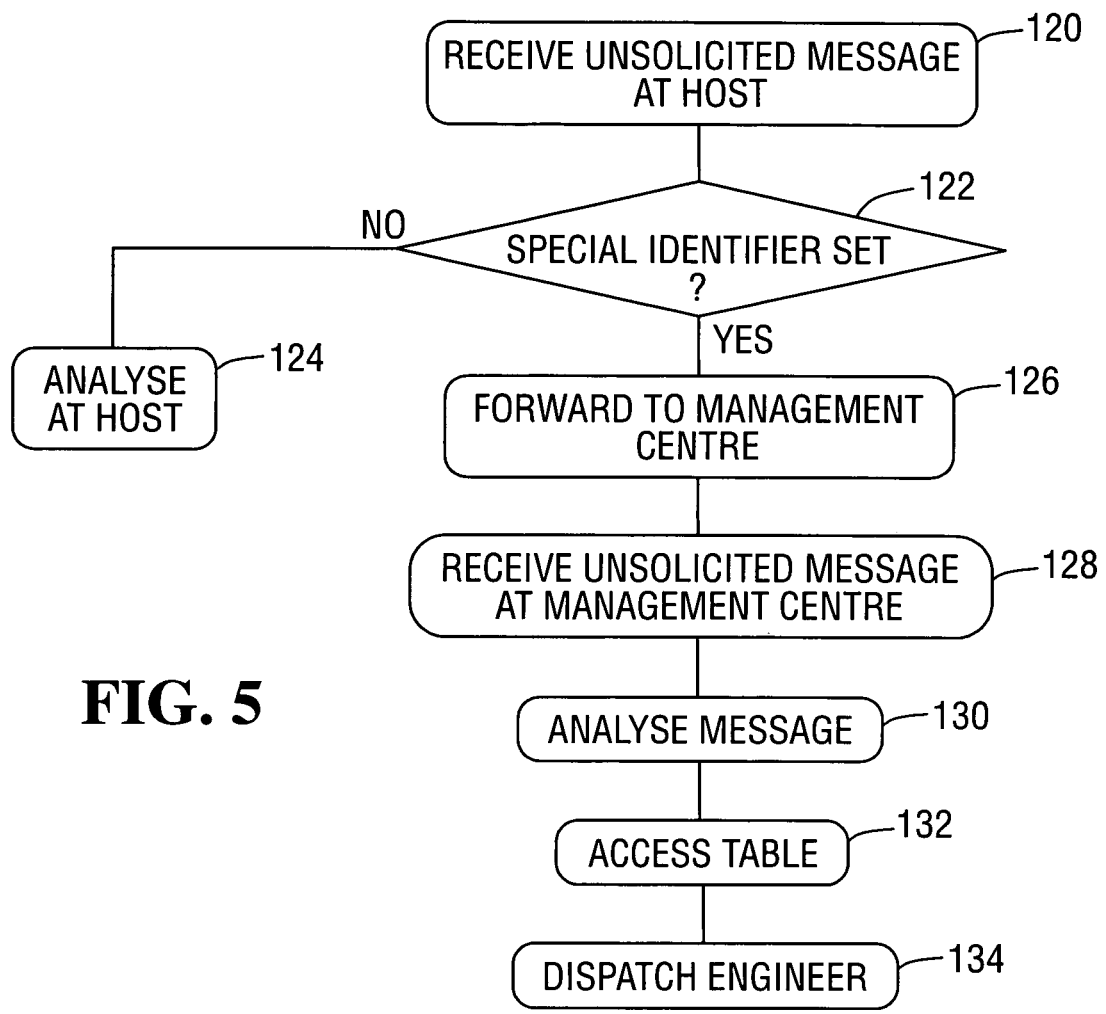
FIG. 5 is a flowchart illustrating the steps involved (at the host and at a management centre) in acting on management information received from the SNMP agent.

The operation of the back-office (that is, the host 12 and the management centre 18) on receipt of the unsolicited message from the ATM 14 will now be described with reference to FIG. 5, which is a flowchart illustrating the steps involved in acting on management information received from the SNMP agent 90.

The host 12 receives this unsolicited message (step 120) and ascertains if the special identifier is set (step 122), indicating that the message is an unsolicited message of the type containing SNMP management information.

If this unsolicited message does not have the special identifier set then it means that it does not contain management information from the SNMP agent 90, so the message is parsed and handled by the host 12 in a conventional manner (step 124).

If this unsolicited message does have the special identifier set then it means that it does contain management information from the SNMP agent 90, so the message is forwarded directly to the management centre (step 126).

The management centre 18 receives the packaged message (step 128), analyses the packaged message to obtain details of the status code corresponding to the malfunction (step 130), and then accesses a table (not shown) in the management centre 18 to ascertain what action is to be taken (step 132). In this example, the malfunction is a failure of a note thickness sensor in the dispenser device 20f, so the table entry corresponding to this status code indicates that an ATM technician should be dispatched to resolve the malfunction.

The management centre 18 then dispatches an ATM technician to resolve the malfunction (step 134). In this example, the management centre 18 is automated and sends a text message to an available ATM technician including an identifier indicating the identity of the ATM 14 that sent the message, and the status code of the malfunction. The ATM technician can use this information to ensure that he/she has the correct replacement part to restore the ATM 14 to full working operation.

It will now be appreciated that the above embodiment has the advantage that an SNMP agent can be installed on an ATM in a legacy network environment so that important management information can be provided by the SNMP agent, even though the ATM 14 is not connected to an IP network.

Various modifications may be made to the above described embodiment within the scope of the invention, for example, in other embodiments a different ATM hardware configuration may be provided. The software components installed may be different to those illustrated. The networks used may be different to those illustrated.

In other embodiments, SSTs other than ATMs may be used, for example, check-in terminals.

In other embodiments, the management information may be encrypted prior to transmission to the host, and decrypted by the management centre 18.

In the above embodiment, the control application comprises a plurality of objects, each object performing a predetermined function. However, it should be appreciated that the particular structure used to implement these functions is a matter of design choice, for example, the control application may be implemented as a single monolithic program, or as a set of discrete objects that can interact with one another.

In other embodiments, the host may extract the management information from an unsolicited message, then send the management information to the management centre.

The invention claimed is:

1. A method of operating a self-service terminal, the method comprising:
    receiving commands from a host at a communication stack of the self-service terminal, the commands relating to actions for the self-service terminal to perform in the form of device functions usable by a management application and screens the self-service terminal is to display while performing the actions;
    receiving management information from the management application of the self-service terminal via the communications stack of the self-service terminal, wherein the communications stack has an Internet Protocol (FP) address and supports communication with the management application using Transmission Control Protocol (TCP) Internet Protocol (IP) (TCP/IP) to obtain the management information from the management application, wherein the management information including a type of device identifier, a status code, and a time at which a fault occurred;
    preparing a message using a different protocol for transmission across a network between the self-service terminal and a host, where the message includes the management information from the communications stack, wherein the network is a legacy network that does not support TCP/IP;
    transmitting the message to the host via the network by sending the message as an incident trap back to the communications stack where it is processed as an unsolicited message that is sent to the host over the network from the communications stack, wherein the unsolicited message includes a special identifier to indicate that the unsolicited message includes the management information and that the unsolicited message is to be forwarded to a management centre by the host;
    receiving the message prepared using the different protocol at the host;
    parsing the message to ascertain if the message contains management information, wherein the step of parsing the received message to ascertain if the message contains management information includes ascertaining if a predetermined device identifier is associated with the message;
    in the event that the message contains management information, forwarding the management information to a remote management centre responsible for maintaining the self-service terminal in normal operation;
    utilizing, by the management centre, at least the status code to ascertain an action to be taken to remedy the fault; and
    transmitting, by the management centre, a text message to a service technician, the text message including the management information and the remedy.

2. A method according to claim 1, wherein the management application is a simple network management protocol (SNMP) agent.

3. A method according to claim 1, wherein the step of receiving management information via the communications stack includes monitoring the communications stack for messages received at a predetermined port.

4. method according to claim 1, wherein the step of preparing a message using a different protocol for transmission across a network includes encrypting the management information.

5. A self-service terminal system, the system comprising:
    a management centre;
    a host coupled by a legacy network to a plurality of self-service terminals, each of the self-service terminals controlled by the host using a request sent the self-service terminals;
    each of the self-service terminals including:
        a plurality of devices, each device providing management information, wherein the management information includes a type of device identifier, a status code, and a time at which a fault occurred while executing the request,
        a management agent adapted to monitor the plurality of devices and to create and transmit a notification in the event that management information from a device indicates the fault occurred, wherein the management agent only supports communication using Transmission Control Protocol and Internet Protocol (TCP/IP),
        a communications stack having an IP address for receiving the transmitted notification from the management agent and receiving the request; and
        a self-service terminal application adapted to:
            receiving commands from the host at the communication stack, the commands relating to actions for the self-service terminal to perform in the form of device functions usable by a management application and screens the self-service terminal is to display while performing the actions;

monitor the communications stack to receive the transmitted notification and commands, package the notification within a host message conforming to a host messaging format, and transmit the host message to the host via the legacy network by sending the host message that conforms to the host messaging format back to the communications stack as an incident trap to be processed as an unsolicited message to deliver to the host from the communications stack, wherein the unsolicited message includes a special identifier to indicate that the unsolicited message includes the management information and that the unsolicited message is to be forwarded to a management centre by the host, wherein the management centre is operable to:

utilize at least the status code to ascertain an action to be taken to remedy the fault, and transmit a text message to a service technician, the text message including the management information and the remedy, wherein transmitting the host message to the host via the network by sending the host message as the incident trap back to the communications stack comprises accessing, by the communications stack, a loopback adapter driver to allow the management application to send the host message to a virtual IP address, wherein the virtual IP address does not have corresponding hardware and is configured to be a loopback adapter IP address.

* * * * *